US006363618B1

(12) United States Patent
Dürr

(10) Patent No.: US 6,363,618 B1
(45) Date of Patent: Apr. 2, 2002

(54) PORTABLE IMPLEMENT, ESPECIALLY POWER SAW

(75) Inventor: Bernhard Dürr, Stuttgart (DE)

(73) Assignee: Firma Andreas Stihl AG & Co. (DE)

( * ) Notice: Subject to any disclaimer, the term of this patent is extended or adjusted under 35 U.S.C. 154(b) by 0 days.

(21) Appl. No.: 09/518,714

(22) Filed: Mar. 3, 2000

(30) Foreign Application Priority Data

Mar. 5, 1999 (DE) ........................................ 199 09 704

(51) Int. Cl.[7] ............................ F02F 7/00; F16C 27/00
(52) U.S. Cl. ...................................... 30/381; 123/195 R
(58) Field of Search ................ 30/381, 276; 123/195 R

(56) References Cited

U.S. PATENT DOCUMENTS 5,029,393 A * 7/1991 Nagashima et al. .......... 30/381
6,192,840 B1 * 2/2001 Durr et al. .................... 30/381

* cited by examiner

*Primary Examiner*—Hwei-Siu Payer
(74) *Attorney, Agent, or Firm*—R. W. Becker & Associates; R. W. Becker

(57) ABSTRACT

A manually guided, portable implement, especially a power saw, is provided. The implement has a cylinder and a crankshaft that is connected to a piston via a piston rod. The implement has an essentially plastic housing as well as a lower crankcase. A stabilizing plate is nearly entirely embedded in the material of the lower crankcase. The one-piece stabilizing plate is provided with support sockets for bolting the lower crankcase to the cylinder. An overall metallic screw connection can thus be established.

9 Claims, 3 Drawing Sheets

PORTABLE IMPLEMENT, ESPECIALLY POWER SAW

BACKGROUND OF THE INVENTION

The present invention relates to a manually guided, portable tool or implement, especially a power saw, cut-off saw, or the like, and includes an internal combustion engine that is disposed in a housing had has a cylinder in which is formed a combustion chamber that is delimited by a piston that moves back and forth. By means of a piston rod, the piston drives a crankshaft that is mounted in an essentially plastic, pan-like crankcase.

With one known implement of this type (DE-OS 32 22 457), the plastic lower crankcase as well as the crankshaft journals and the journal sections thereof are secured in place on the cylinder in common via bolts that extend through the underside of the crankcase. Since during operation a not inconsiderable portion of the forces that occur in the region of the crankshaft is introduced into the crankcase and thus stress the latter, the crankcase must have a stable and hence complex configuration since a lack of sealing of the crankcase that occurs due to settling can adversely affect the ability of the implement to function.

It is therefore an object of the present invention to improve the internal combustion engine provided in a portable implement of the aforementioned general type in such a way that a permanent fixed connection is achieved between the cylinder and the plastic crankcase, whereby the overall height of the composite cylinder/crankcase is to be kept small.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
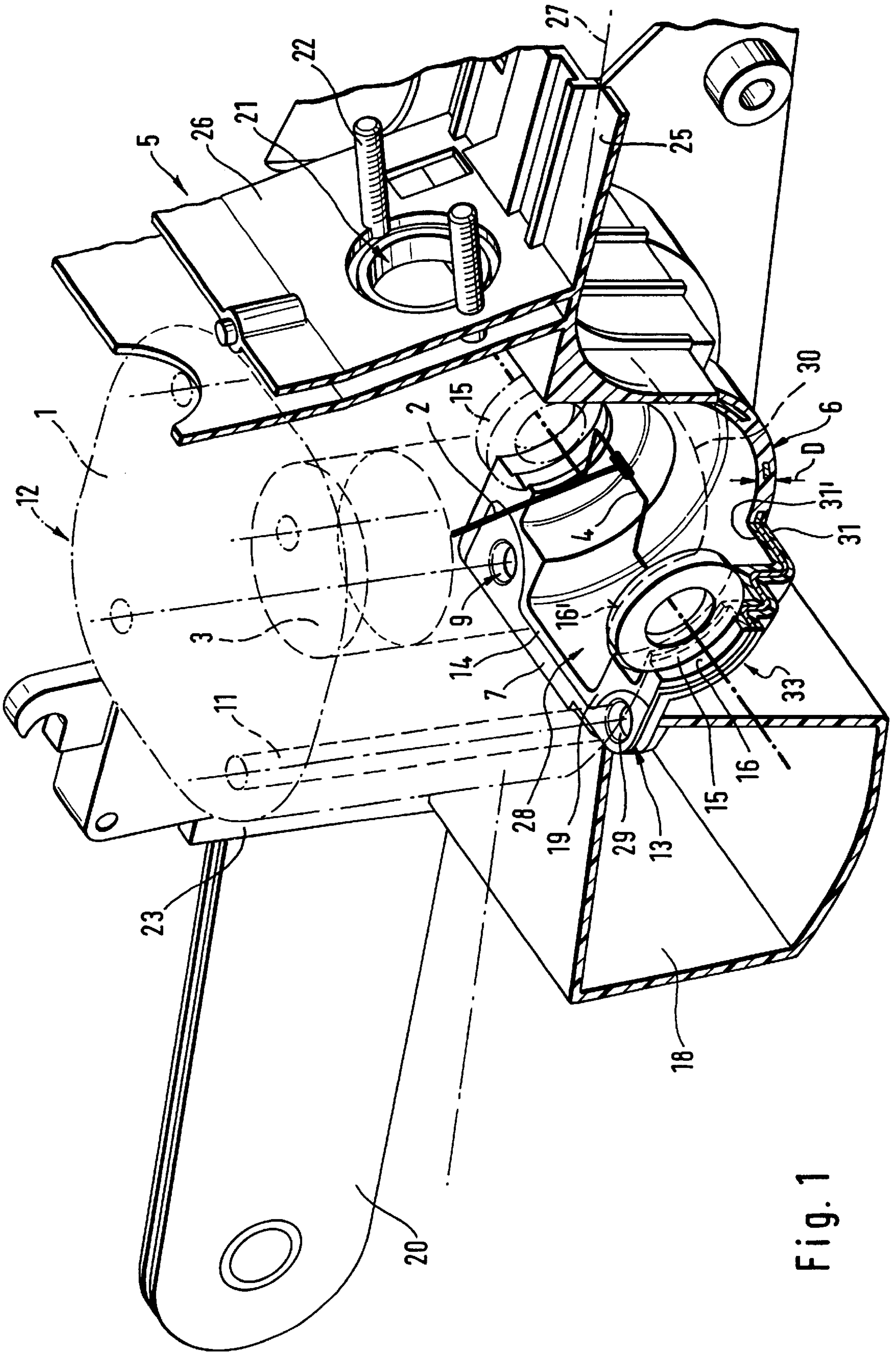
FIG. 1 is a perspective view of a power chain saw partially cross-sectioned through the crankcase.

The portable implement of the present invention is characterized primarily in that a metallic stabilizing plate is embedded in the plastic of the lower crankcase, wherein the stabilizing plate forms the sealing surface of the lower crankcase to the upper crankcase.

Due to the nearly complete, full-surface embedment of a prefabricated stabilizing plate, which is preferably embodied as a press or stamping part, in the region of the lower plastic crankcase, a reinforcement is provided by means of which a permanent connection is established with the cylinder of the internal combustion engine. The one-piece stabilizing plate is provided with support sockets to enable the lower crankcase to be bolted to the cylinder, with the support sockets enabling a metallic screw connection. The spherical, or at least hemispherical, configuration of the stabilizing plate matches the shape of the crankcase and is thus surrounded on both sides by the plastic of the crankcase. For the positive connection with the plastic of the crankcase, the stabilizing plate is furthermore provided with openings or apertures and can expediently be made from a perforated plate. The apertures or perforations enable a good joggling of the stabilizing plate with the plastic of the crankcase, which is preferably injected about the stabilizing plate in an injection molding process. Thus, after curing of the plastic crankcase, the stabilizing plate is seated securely in the crank pan in a non-detachable manner free of play. The overall height of such a metal/plastic composite crankcase is less than that of a crankcase that consists entirely of plastic. A high strength of the crankcase is achieved by using such a stabilizing plate embedded in plastic. The support sockets, which are integrally or monolithically formed with the stabilizing plate, are provided at the respective corners of the stabilizing plate; screw bolts with which the lower crank pan is fixed in position extend through the support sockets. Despite the fact that the pan is made of plastic, the support sockets enable a truly metallic screw connection at the four corners of the stabilizing plate, which when viewed in plan has a square or rectangular configuration. The crank shaft journals are thus reliably fixed in the region of the journal or bearing sections.

Further specific features of the present invention will be described in detail subsequently.

DESCRIPTION OF THE PREFERRED EMBODIMENTS

Referring now to the drawings in detail, the manually guided, portable implement or tool illustrated in the drawings is a power chain saw that is operated by an internal combustion engine 12 disposed in a housing 5.

The internal combustion engine 12 is provided with a cylinder 1 having an interior combustion chamber that is delimited by a piston 3 that move back and forth. The piston 3 is connected to a piston rod 2, the other end of which drives a crankshaft 4 that is disposed in a crankcase.

The ends of the crankshaft 4 are rotatably held in respective journals 15, which are each disposed is split journal sections. A lower journal or bearing section 16 is formed on opposite side walls 33 on the lower crankcase 6. The corresponding journal or bearing sections 16' are appropriately formed on the upper crankcase 30 of the internal combustion engine 12. It can also be expedient to secure the journal sections 16, 16' on the shroud of the cylinder 1 of the internal combustion engine 12.

The lower crankcase 6 is made of plastic and, as illustrated, can be integral or monolithic with the engine housing 5, which is similarly made of plastic, thereby keeping the weight of the portable implement low. In some cases, the lower plastic crankcase 6 can also be a component that is separate from the engine housing 5 and which is to be connected to the frame of the housing 5 via anti-vibration elements.

The engine housing 5 is produced as a composite injection molded part. The components of the engine housing 5 include in particular the connection 23 for the guide bar 20, an integrated tank 18 for fuel and oil, the pan-like lower crankcase 6, as well as walls of a carburetor chamber 25, on the partition 26 of which toward the cylinder 1 a carburetor is to be secured. Disposed in the partition 26 is an opening 21 for an intake pipe or manifold that leads from the cylinder 1 to the non-illustrated carburetor. The carburetor is secured in position on the partition 26 by means of securing bolts 22.

The lower crankcase 6 is integrally or monolithically formed with the engine housing 5 and is disposed between the tank 18 and the carburetor chamber 25; it has an essentially pan or shell-like shape. Transverse to the longitudinal central axis 27 of the portable implement, the lower crankcase 6, on both sides, has semi-circular recesses or sections, the bearing sections 16. At its opening 28 facing the cylinder 1 the lower crankcase 6 ends in the form of a flange-like mounting base 19 that in the plan view of FIG. 3 has an essentially square or rectangular contour. Disposed in the corners of the frame-like base 19 are mounting openings 29. The metal cylinder 1 of the internal combustion engine 12, and in particular an upper crankcase 30 formed onto the cylinder, rests upon the mounting base 19 and is held thereon by means of screw bolts 11 that extend through the mounting openings 29.

A one-piece support or stabilizing plate 7 is embedded in the plastic of the lower crankcase 6 so as to extend throughout the crankcase. Both sides of the stabilizing plate 7 are surrounded by a plastic layer 31, 31', i.e., the stabilizing plate 7 is completely embedded in plastic, as a result of which the stabilizing plate 7 is held in the lower crankcase 6 in a non-detachable manner and free of play. Due to the large-surface positive connection, a loosening of the stabilizing plate 7 as a result of operation of the portable implement is avoided. The spherical, or at least hemispherical, shape of the stabilizing plate 7 is adapted to the pan-like lower crankcase 6. The stabilizing plate 7 is similarly provided with recesses or formed sections for the formation of the journal or bearing section 16, 16'.

In the region of the mounting openings 29 the stabilizing plate 7 is advantageously provided with support sockets 9 that can be easily produced by stamping or similar processes. In the region of the mounting base 19, the stabilizing plate 7 rests metallically on the upper crankcase 30, for which purpose that sealing surface 34 of the stabilizing plate 7 that faces the cylinder 1 is free of plastic. The stabilizing plate 7 rests metallically against a facing counter surface of a separating plane 13 between the upper crankcase 30 and the lower crankcase 6. During the injection process for the crankcase 6, the support sockets 9 determine the mounting openings 29 for the screw bolts 11. By means of the support socket 9, the head of a screw bolt 11 conducts the fastening forces into the stabilizing plate 7; the plastic pan of the crankcase is free of fastening forces. Due to the shape of the stabilizing plate 7 with its support sockets 9, a metallic screw connection is provided so that the flow characteristics of the plastic do not lead to loosening and hence to a lack of sealing at the crank pan.

As a consequence of the use of a stabilizing plate 7 that is embedded in the plastic of the pan-like lower crankcase 6, the overall height of the composite cylinder-crankcase is also reduced, since the thickness D of the lower crankcase 6 can be less than the thickness of a crankcase that is made entirely of plastic. In this connection, the stabilizing plate 7 assumes the reinforcement of the lower crankcase 6 and absorbs the transverse forces that are introduced from the crankcase journals 15.

Figure 2:
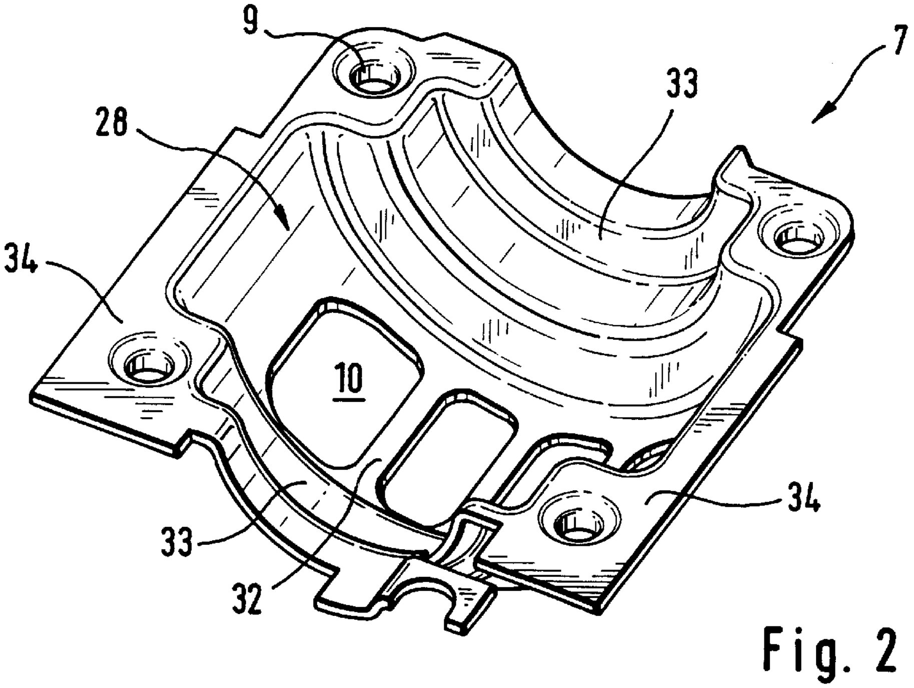
FIG. 2 is a perspective view of one exemplary embodiment of an inventive stabilizing plate embedded in the crankcase.
Figure 4:
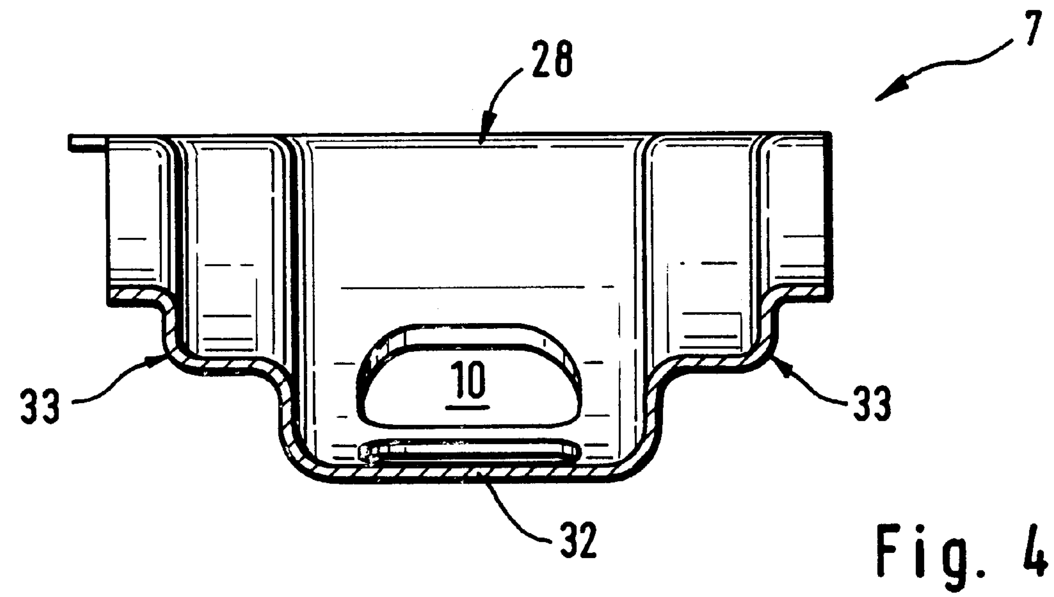
FIG. 4 is a cross-sectional view taken through the stabilizing plate along the line 4—4 in FIG. 3.

As can be seen from FIGS. 1, 2, and 4, the pan-shaped stabilizing plate 7 is corrugated in the region of the side walls 33 of the lower crankcase 6. This provides a high resistance to bending for the stabilizing plate 7, especially to the crankshaft 4.

Figure 3:
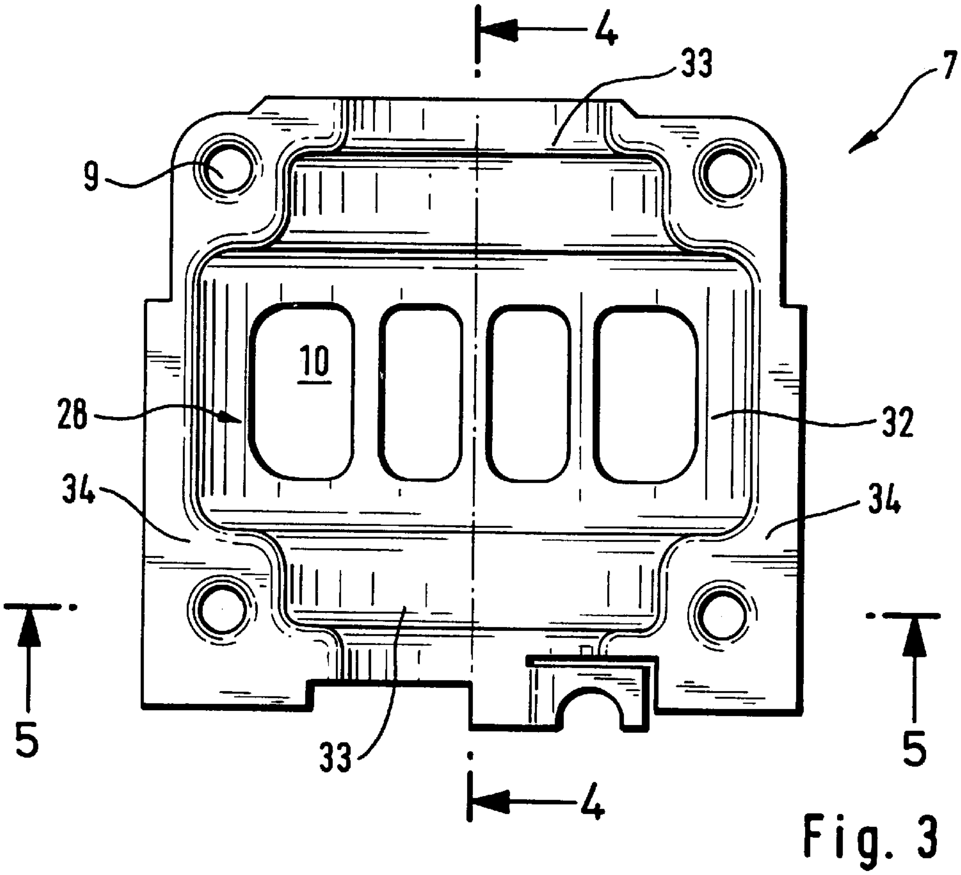
FIG. 3 is a plan view of the stabilizing plate of FIG. 2.

FIGS. 2 and 3 show that the partially cylindrical base 32 of the stabilizing plate 7, which is advantageously embodied as a pressed or stamped part, is provided with openings or apertures 10 that extend over the width of the base and in the circumferential direction are disposed close to one another. In the region of the apertures 10, the plastic layers or coatings 31, 31' that surround the stabilizing plate 7 are fused with one another, so that a reliable positive connection that is free of play of the stabilizing plate 7 in the plastic of the crank pan is provided. The side walls 33 of the stabilizing plate 7 are expediently provided with appropriate openings; the stabilizing plate 7 is advantageously made of a suitable perforated plate. To further improve the positive connection of the stabilizing plate 7 with the plastic of the lower crankcase 6, the finished stamped and pressed stabilizing plate 7 is roughened up on its surfaces, for example by suitable processes such as sandblasting or etching, before it is placed into the appropriate injection mold for producing the crank pan.

Figure 5:
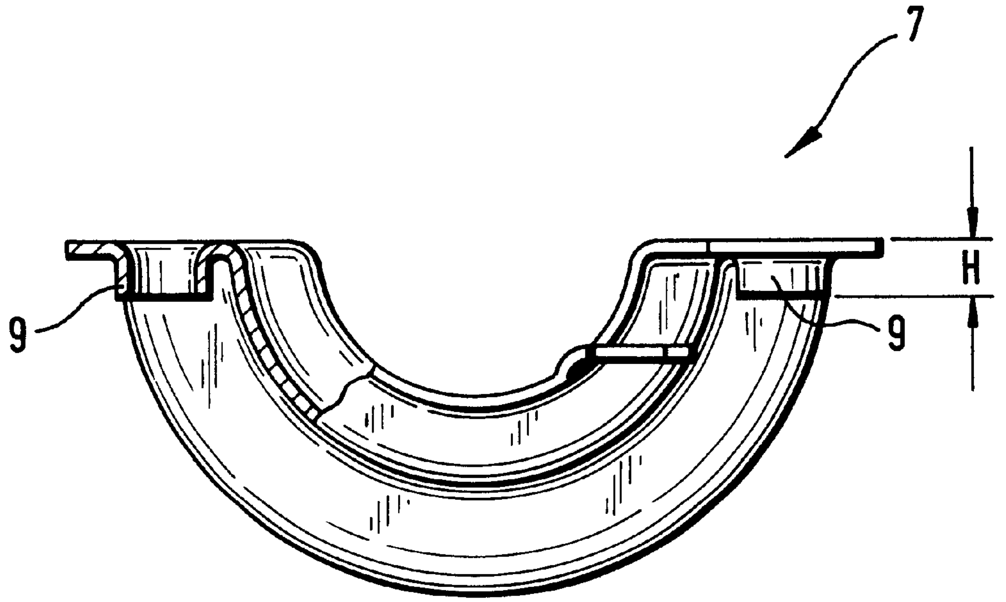
FIG. 5 is a cross-sectional view through the stabilizing plate taken along the line 5—5 in FIG. 3.

FIGS. 2 and 5 show the formed-on support sockets 9 as well as the metallic sealing surface 34 that rests against the upper crankcase 30. The axial height H of the support sockets 9 corresponds to the thickness of the mounting base 19, i.e., extends completely through the plastic material.

FIG. 3, in conjunction with FIGS. 4 and 5, clearly illustrate the apertures 10 of the base 32 of the stabilizing plate 7 as well as the partially cylindrical, pan or shell-like shape thereof. The side walls 33 of the stabilizing plate 7 are, as indicated previously, stepped in a corrugated manner and reinforce not only the side walls, but rather the entire stabilizing plate becomes stiffer with regard to bending and torsion forces and can therefore absorb the forces that occur, so that the plastic material remains essentially free of significant forces.

From FIG. 4, which is a cross-sectional view through the stabilizing plate 7 taken along the line 4—4 in FIG. 3, one can clearly recognize here also the large-surface apertures 10 of the base 32 of the stabilizing plate 7 as well as the corrugation of the side walls 3, which impart to the stabilizing plate 7 a high bending resistence in the direction of the line 5—5 in FIG. 3.

The cross-sectional view of FIG. 5 shows the stabilizing plate 7 with the formed-on support sockets 9. The section through the threaded socket or sleeve 9 clearly shows that this is monolithically drawn from the wall of the stabilizing plate 7.

The specification incorporates by reference the disclosure of priority document 199 09 704.6 of Mar. 5, 1999.

The present invention is, of course, in no way restricted to the specific disclosure of the specification and drawings, but also encompasses any modifications within the scope of the appended claims.

I claim:

1. A manually guided, portable implement, comprising:

a housing;

an internal combustion engine disposed in said housing;

a cylinder provided in said internal combustion engine, wherein said cylinder has a combustion chamber that is delimited by a piston that moves back and forth;

a crankshaft that is driven by said piston via a piston rod;

a pan-shaped, plastic, lower crankcase in which said crankshaft is mounted; and a metallic stabilizing plate embedded in plastic of said crankcase, wherein said stabilizing plate forms a sealing surface of said lower crankcase to an upper crankcase.

2. An implement according to claim 1, wherein said stabilizing plate rests metallically against a facing counter surface of a separating plane between said upper crankcase and said lower crankcase.

3. An implement according to claim 1, wherein said lower crankcase is provided with a mounting base, and wherein support sockets are formed on said stabilizing plate and extend through said mounting base.

4. An implement according to claim 1, wherein said stabilizing plate is provided with apertures via which said stabilizing plate is joggled with plastic of said lower crankcase.

5. An implement according to claim 1, wherein said stabilizing plate is a perforated plate.

6. An implement according to claim 1, wherein surfaces of said stabilizing plate are roughened.

7. An implement according to claim 1, wherein said stabilizing plate has an approximately semi-cylindrical configuration in conformity with said pan-shape of said lower crankcase.

8. An implement according to claim 1, wherein said stabilizing plate is a press/stamped part.

9. An implement according to claim 1, wherein said housing and said pan-shaped, lower crankcase are a monolithic component.

* * * * *